W. J. GOODFELLOW.
CIGAR BINDER CUTTING BENCH.
APPLICATION FILED MAR. 4, 1920.
1,370,431.
Patented Mar. 1, 1921.
3 SHEETS—SHEET 2.
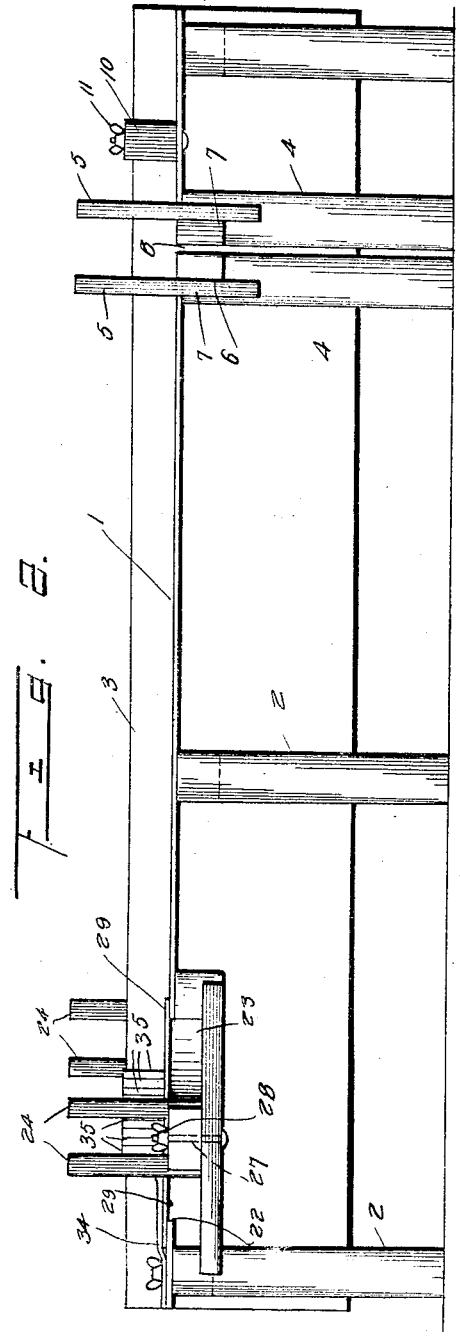
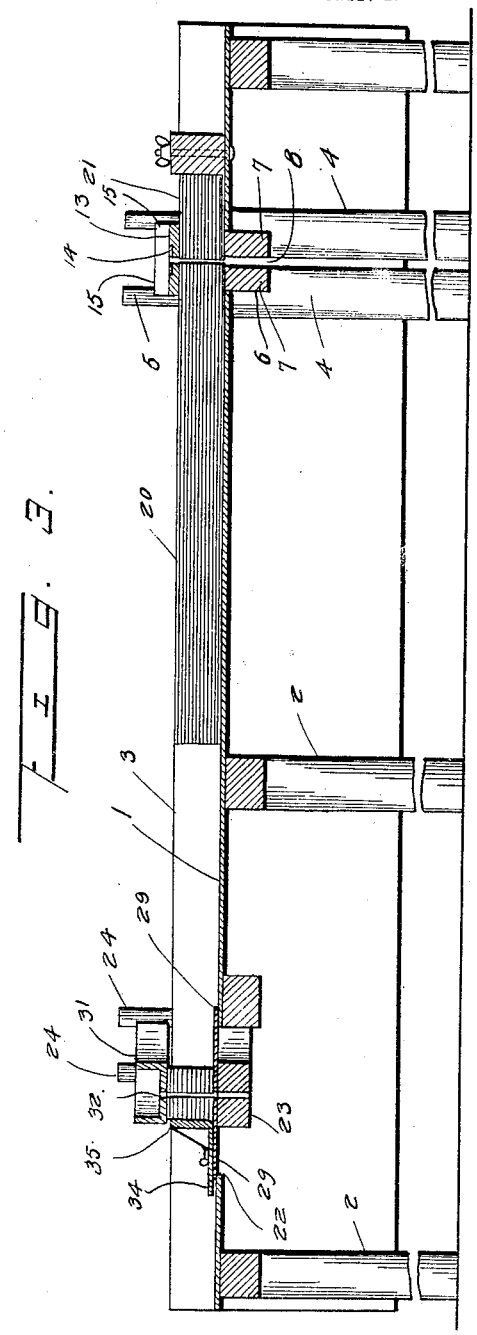
W. J. Goodfellow
By *[signature]*
Attorney

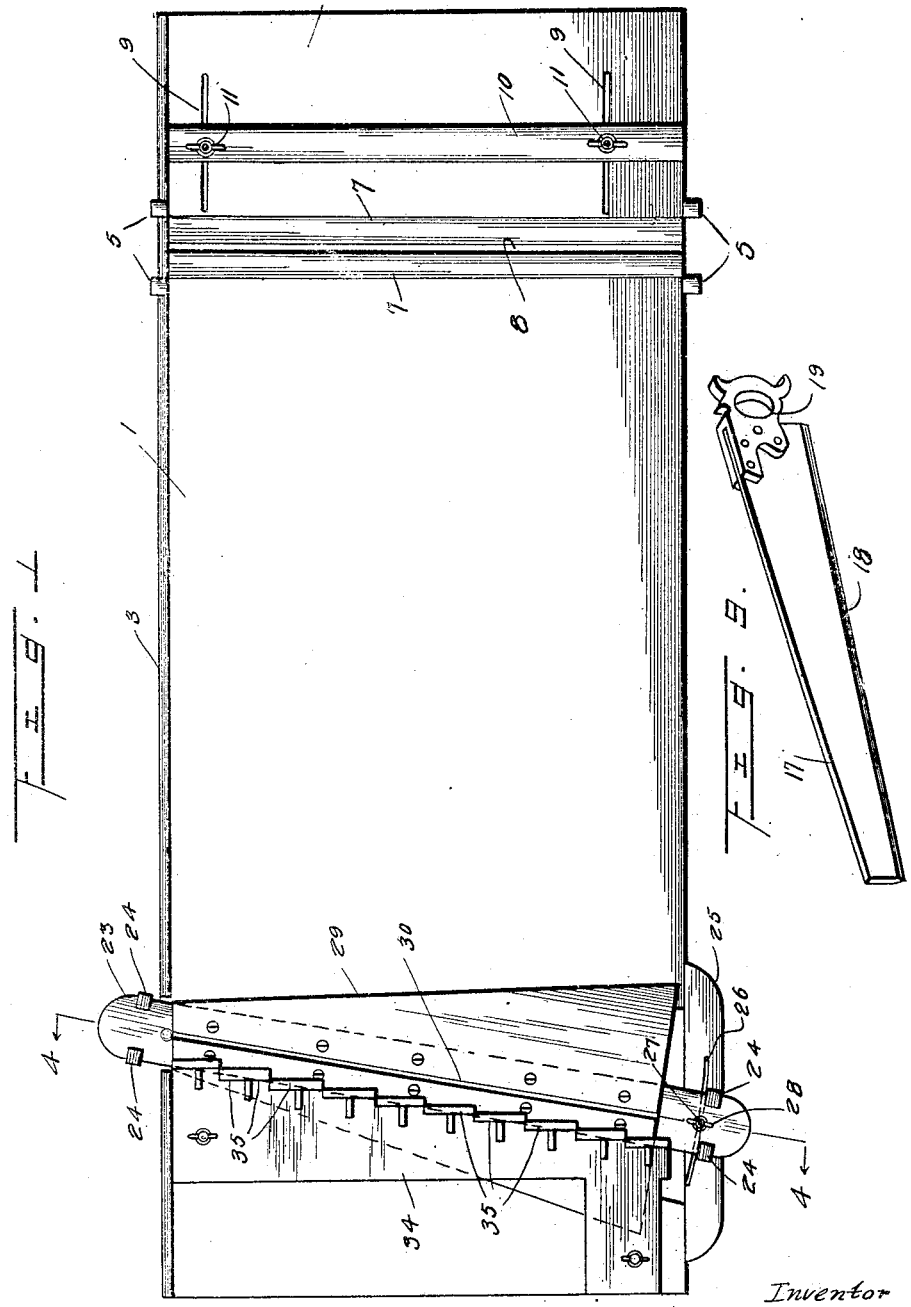

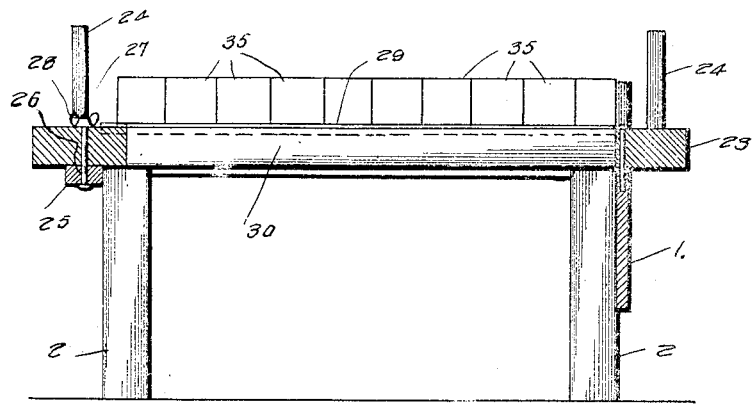
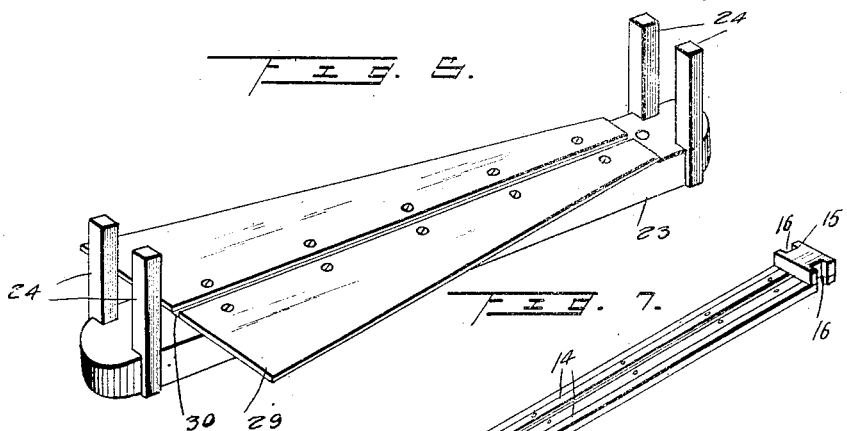

UNITED STATES PATENT OFFICE.

WILLARD J. GOODFELLOW, OF BENTLEY SPRINGS, MARYLAND.

CIGAR-BINDER-CUTTING BENCH.

1,370,431.  Specification of Letters Patent.  Patented Mar. 1, 1921.

Application filed March 4, 1920. Serial No. 363,193.

*To all whom it may concern:*

Be it known that I, WILLARD J. GOODFELLOW, a citizen of the United States, residing at Bentley Springs, in the county of Baltimore and State of Maryland, have invented certain new and useful Improvements in Cigar-Binder-Cutting Benches; and I do hereby declare the following to be a full, clear, and exact description of the invention, such as will enable others skilled in the art to which it appertains to make and use the same.

This invention relates to benches especially adapted to be used for cutting cigar binders and it consists in the novel features hereinafter described and claimed.

An object of the invention is to provide a bench of the character stated upon which may be placed a stack of the sheets of material which is to be cut into blanks.

The first operation is to sever the stacks of sheets into bundles. The second step is to cut the bundles into bunches and the final step is to cut the bunches into blanks which are trapesoidal in shape and these blanks are used for wrapping the fillers of cigars in a usual manner. The sheets of material are preferably made from pulp which is reduced from the stems of tobacco and flavored with the juices of the natural plant thereby providing a material which will burn freely when made up in the cigar, will have sufficient strength to hold the filler in proper shape and when burning will have the natural aroma of tobacco.

A further object of the invention is to provide a bench as stated in conjunction with which an ordinary saw blade may be used for effecting the cutting of the material as stated. The teeth which are usually upon the saw blade are removed and the blade is ground to a straight cutting edge. This blade is used for cutting the material into bundles and bunches and also for cutting the bunches into the blanks.

A further object of the invention is to provide upon a bench as stated means for adjusting the guides or stops whereby the dimensions of the bundles may be varied, also there may be variations in the dimensions of the bunches. Also the provision of adjustable means whereby the angle of inclination of the inclined edges of the trapesoidal blanks may be varied.

A still further object of the invention is to provide new and improved guides and straight edges for directing the blade during the cutting operations as hereinbefore stated, the said guides and straight edges being so assembled that they may be readily separated from each other whereby the stacks, bundles or bunches may be readily placed between them or removed therefrom.

In the accompanying drawings:—

Figure 1 is a top plan view of the cigar binder cutting bench,

Fig. 2 is a side edge elevation of the same,

Fig. 3 is a longitudinal sectional view of the same,

Fig. 4 is a transverse sectional view of the bench cut on the line 4—4 of Fig. 1, Fig. 5 is a perspective view of a saw guide used upon the bench, Fig. 6 is a fragmentary perspective view of a series of stops used upon the bench, Fig. 7 is a perspective view of a straight edge which is used upon the bench at the point where the stack is reduced to bunches and the bunches reduced to bundles, Fig. 8 is a perspective view of a straight edge, in inverted position and which is used at the point upon the bench where the bunches are reduced to blanks, Fig. 9 is a perspective view of the blade which is used for cutting the material as stated.

As illustrated in the accompanying drawings the cigar binder cutting bench comprises a platform 1 which is mounted upon leg frames 2 in a usual manner. The said platform is provided at one of its longitudinal edges with an upstanding rail 3. Guide posts 4 are located in the vicinity of one end of the platform 1 and are arranged in pairs, the members of which are spaced from each other, a pair of each set of posts is located under each longitudinal edge portion of the platform and the said posts are provided at their upper ends with projecting portions 5 which extend above the upper surface of the platform. The posts 4 are provided at points below the platform 1 and at their inner edges with notches 6 and the said notches receive a bar 7 which is disposed transversely of the platform 1 and having its upper surface substantially flush with the upper surface of the platform. The bar 7 is provided along its median longitudinal dimensions with a slot 8 which extends transversely across the platform and which serves as a guide for a blade hereinafter described.

The platform 1 is provided in the vicinity of its longitudinal edges and at one side of the bar 7 with slots 9 which are disposed longitudinally of the platform and a stop bar 10 is mounted upon the platform and extends across the same and transversely across the slots 9. Bolts 11 are carried by the bar 10 and pass through the slots 9. The heads of the said bolts engage against the under side of the platform and the bolts are provided at their upper ends with the wing nuts 12 which bear at their lower faces against the upper surface of the bar 10 and serve to hold the bar at an adjusted position upon the platform when they are tightened upon the bolts.

A straight edge (best shown in Fig. 7) is adapted to be placed between the members of the pairs of guide posts 4 and the projections 5 thereof. Said straight edge comprises spaced strips 13 which are reinforced at their inner edges by strips 14 applied thereto. Blocks 15 are applied to the ends of the strips 13 and bridge the space between the same. The said blocks are provided at their ends with recesses 16 which are adapted to receive the inner edge portions of the post projections 5. The cutter which is used in conjunction with the bench as hereinbefore described comprises a blade 17 which is a usual saw blade with the teeth removed and ground at one edge to a cutting edge 18. A handle 19 is applied to one end of the blade 17 in a usual manner.

In operation the stack of the sheets of material indicated at 20 in Fig. 3 is placed upon the intermediate portion of the platform and the bar 10 is secured at an adjusted position upon the platform and the distance from the inner vertical edge of the bar 10 to the adjacent edge of the slot 8 in the bar 10 will be equal to the transverse breadth of the bundles into which the stack 20 is cut. One of the said bundles is indicated at 21 in Fig. 3 of the drawings. After the stack has been placed upon the platform and the edge of the stack has been brought in contact with the inner vertical edge of the bar 10 and the straight edge of which the strips 13 are component parts is positioned between the projections 5 of the posts 4, the operator uses the blade 17 by passing the same through the space between the strips 13 and 14 and cuts a bundle 21 from the stack 20. This bundle is then removed and the operation is repeated until the entire stack is reduced to bundles. These bundles are then placed upon the intermediate portion of the platform and the bar 10 may be readjusted and the bundles are reduced by the cutting operation stated into bunches.

The platform 1 is provided at that end portion opposite the end portion at which the posts 4 are mounted with a recess 22, the side edges of which converge toward each other from one edge of the platform to the other edge thereof. Therefore one end of the recess is smaller than the other end. A bar 23 is pivotally mounted upon the table at the smaller end of the recess 22 and its upper surface is substantially flush with the upper surface of the platform 1. The bar 22 carries at its opposite end portions upstanding standards 24 which are located at the side edge portions of the bar and are spaced from each other at their inner sides. The free end portion of the bar 23 extends transversely across and rests upon a shelf 25 which is fixed to the table. The shelf 25 is provided with an arcuate slot 26 and a bolt 27 passes transversely through the bar 26 and the slot and carries a nut 28 which when tightened secures the bar 23 at an adjusted position with relation to the platform. Wing plates 29 are attached to the upper surface of the bar 23 and their outer portions lie over the upper surface of the adjacent parts of the platform 1. The inner edges of the plates 29 are spaced from each other and are flush with the side edges of a slot 30 provided in the bar 23 and which is disposed along the median longitudinal dimension thereof. A straight edge bar 31 is used in conjunction with the bar 23. The said straight edge bar 31 is provided with a longitudinally disposed slot 32 and is further provided in the vicinity of its ends and at its side edges with notches 33 which are adapted to loosely receive the standards 24. A stop plate 34 is mounted upon the platform 1 adjacent the recess 22 and an edge portion of the said plate projects over one of the edges of the said recess. The said stop plate 34 is provided upon its upper side with a series of upstanding abutments 35 which are arranged in stepped relation with respect to each other.

When the bunches, hereinbefore described are about to be cut or reduced to the trapesoidal blanks, the bunches are placed upon the wing plates 29 and one edge of each bunch is placed against the adjacent face of one of the abutments 35 and by reason of the stepped relation of the abutments, the different bunches will have a similar arrangement with relation to each other, therefore when the blade 17 is inserted through the slot 32 of the bar 31, the bunches are cut on the bias and hence each bunch is reduced or cut into two packs of blanks and these blanks are of trapesoidal shape. The blanks thus cut are ready to be used as binders in the manufacture of cigars and for retaining the fillers as hereinbefore mentioned.

By shifting or adjusting the bar 23 upon its pivotal connection with the bench, it is apparent that the angle of inclination of the bias edges of the blanks may be varied and thus the blanks may be cut and adapted for cigars of different shapes as panetela, perfecto, and the like. Also it is apparent that by removing one of the plates 34 and substituting another plate in its stead, the said substituted plate having its abutment arranged with their abutting surfaces at different distances apart the apparatus may be adjusted for cutting blanks of different sizes and therefore provision is made for supplying the blanks for large or small cigars.

Having thus described my invention, what I claim is:

1. A bench adapted to be used for cutting cigar binder blanks comprising a platform, said platform being adapted to receive at its intermediate portion a stack of sheets, means located at one end portion of the platform and adapted to be used for cutting the stack of sheets into bunches and bundles and means located at the opposite end portion of the platform and adapted to be used for cutting the bunches into blanks.

2. A bench adapted to be used for cutting cigar binder blanks comprising a bench adapted to receive a stack of sheets, means located at one end portion of the bench for cutting the stack into bundles and bunches, and means located at the opposite end portion of the platform for cutting the bundles into blanks, said blanks being of trapesoidal shape.

3. A cutting bench comprising a platform having a recess, a bar disposed transversely of the platform and having its upper surface flush with the upper surface of the platform and provided with a slot, a stop bar adjustably mounted upon the platform adjacent the first mentioned bar, a straight edge having a slot and adapted to be positioned above the first mentioned bar, and means mounted upon the bench for guiding the straight edge vertically.

4. A cutting bench comprising a platform having a recess, a bar pivoted to the bench at the recess, wing plates mounted upon the bar and extending over the adjacent portions of the bench, said bar having a slot, means for securing the bar at an adjusted position, guiding standards mounted upon the bar, a straight edge loosely received between the guiding standards and having a slot, and abutments mounted upon the bench adjacent the bar.

5. A cutting bench comprising a platform having a recess provided with converging side edges, a bar pivoted to the bench and located in the recess and provided with a slot, means for securing the bar at an adjusted position, guiding standards carried by the bar, wing plates mounted upon the bar at the opposite sides of the recess and extending over the adjacent portions of the platform, a straight edge having a slot and loosely received between the guiding standards and abutments mounted upon the platform adjacent the bar.

6. A cutting bench comprising a platform having a recess, a bar pivotally mounted upon the bench and located within the recess, means for securing the bar at an adjusted position, guiding standards carried by the bar, a straight edge loosely received between the guiding standards, and a stop plate mounted upon the platform and having abutments located thereon, said abutments being arranged in stepped relation with respect to each other.

In testimony whereof I affix my signature in presence of two witnesses.

WILLARD J. GOODFELLOW.

Witnesses:
T. B. Young,
Mrs. James Decker.